United States Patent [19]

Carlo

[11] Patent Number: 4,515,033

[45] Date of Patent: May 7, 1985

[54] DUAL MODE SHIFTER FOR AUTOMATIC TRANSMISSIONS

[75] Inventor: Louis D. Carlo, Litchfield, Ohio

[73] Assignee: Mr. Gasket Company, Cleveland, Ohio

[21] Appl. No.: 386,672

[22] Filed: Jun. 9, 1982

Related U.S. Application Data

[63] Continuation-in-part of Ser. No. 189,430, Sep. 22, 1980, Pat. No. 4,370,897.

[51] Int. Cl.³ .................. G05G 7/06; F16H 57/06; G09F 9/00
[52] U.S. Cl. ........................... 74/476; 74/142; 74/473 R; 74/475; 74/538; 116/28.1; 116/DIG. 20; 340/143; 340/815.19
[58] Field of Search ............ 74/142, 473 R, 475, 74/476, 538; 116/28.1, DIG. 20; 340/143, 815.19

[56] References Cited

U.S. PATENT DOCUMENTS

| | | | |
|---|---|---|---|
| 2,671,425 | 3/1954 | Schneider | 116/DIG. 20 |
| 3,231,857 | 1/1966 | Miller | 116/28.1 X |
| 3,643,622 | 2/1972 | Cryer | 116/28.1 |
| 3,665,775 | 5/1972 | Freeman | 74/142 X |
| 3,701,333 | 10/1972 | Schwerdhoefer | 116/28.1 |
| 3,800,614 | 4/1974 | Johnson | 74/473 R |
| 3,941,008 | 3/1976 | Cambria | 74/475 X |
| 4,084,448 | 4/1978 | Wolfe | 74/475 |
| 4,370,897 | 2/1983 | Carlo | 74/475 |

FOREIGN PATENT DOCUMENTS

1211452 11/1970 United Kingdom ....... 116/DIG. 20

Primary Examiner—Allan D. Herrmann
Attorney, Agent, or Firm—Roylance, Abrams, Berdo & Goodman

[57] ABSTRACT

A gear shifter for automatic transmissions having a true ratchet mode for operating between the drive gears and a gate mode optionally usable for the drive gears. Only gate mode accesses park and reverse gears. The invention provides a floating pawl at the ends of two links in a three member, four pivot point linkage. This linkage provides the advantages that the operating handle is always engaged and yet permits easy change-over from one mode to the other.

45 Claims, 14 Drawing Figures

FIG.6
GATE MODE
LOW

FIG.7
RACHET MODE

FIG.8
RACHET MODE

FIG.9
GATE MODE
REVERSE

FIG. 10
GATE MODE
PARK

DUAL MODE SHIFTER FOR AUTOMATIC TRANSMISSIONS

REFERENCE TO RELATED APPLICATIONS

This application is a continuation in part of Ser. No. 189,430 filed on Sept. 22, 1980, in the name of Louis D. Carlo and entitled "Dual Mode Shifter For Automatic Transmissions" assigned to the same asignee as the present invention, this prior application being incorporated herein in its entirety by reference; and now issued as U.S. Pat. No. 4,370,897 on Feb. 1, 1983.

GENERAL FIELD OF THE INVENTION

The present invention pertains to automotive shifters, particularly shifters for automatic transmissions, and more particularly such shifters for us in "drag races", more serious racing, and for ordinary street use.

BRIEF SUMMARY OF THE INVENTION

The invention provides a dual mode shifter wherein a true ratchet action is provided between neutral and the two or three forward gears in the transmission being controlled by the invention shifter. The second mode of operation involves a gate action which operates between the same drive gears and neutral, reverse and park. It is necessary to move the handle of the shifter when in neutral in order to get access between the ratchet mode for the drive ranges and the gate mode conrolling reverse and park.

Further, the invention shifter provides direct access to and from neutral from both modes, a feature of versatility not available in some prior art shifters.

The present improved shifter, as compared to the shifter of the parent patent application identified above, has many additional advantages which flow, primarily, from the improvement of permitting the operator to use either the ratchet mode for the forward gears or to use the gate mode for the forward gears. That is, the present invention provides a dual mode shifter which is fully dual, i.e., the operator can choose either mode for controlling the forward gears.

DEFINITION OF A TERM

As used in the specification and claims herein, the terms "ratchet", "ratchet mode", and the like, based on the standard dictionary definition, shall be understood to mean a mechanism wherein the manually operated handle has a home position and is free to rock to and fro away from that home position to thus operate the shifter and hence the transmission through its gears; the mechanism also including spring means to bias the handle to this normal home position, and further including a pawl and cooperating ratchet teeth to obtain the motion.

DESCRIPTION OF THE PRIOR ART

Pure ratchet shifters are well known in the art; see U.S. Pat. Nos. 3,665,775 to Freeman and 3,800,614 to Johnson. Similarly, straight gate type shifters are also known in the art, see U.S. Pat. No. 4,118,999 to Beiber for a gate type shifter for an automatic shifter.

Hybrid shifters such as the present invention are not so well known in the art. A somewhat pertinent patented structure can be found in Cambria U.S. Pat. No. 3,941,008 wherein the handle 28 moves progressively from one shift position to another, and the device includes a ratchet comprising a pawl 126 and teeth 104 and 102. However, the purpose of this ratchet is to prevent the handle from progressing more than one gear position at a time, a momentary release being required to permit progression from one position to the next position. Thus, the ratchet in Cambria is used as stop means to prevent overshifting, rather than to directly shift the transmission as is done in the present invention. In summary, to fully differentiate from Cambria, the ratchet of the invention operates the transmission directly rather than indirectly as a stop means as in Cambria.

The prior art also includes dual mode shifters for automatic transmissions wherein the ratchet means includes a split pawl. Another such negative feature is a handle which is completely disengaged from the ratchet pawl when it moves out of ratchet mode into gate mode.

Both these features have disadvantages as compared to the present invention. When lifting the handle away from the ratchet pawl, be it a single or a split pawl, problems could be encountered in later relocating the pin or other means on the handle with the pawl. This is alleviated in the invention in that the handle is always engaged at a permanent pivot point between the pawl and the handle.

The split pawl feature is less desirable than the unitary pawl member of this invention. A split pawl doubles the possibility of failure as there are two pawl members. Further, manufacture, costs, and assembly are needlessly complicated because the "pawl" thus comprises an assembly of several members, each separately pivoted on separately mounted pivot means, and often including spring means on the pawl members themselves in order to operate with the ratchet teeth.

This same split pawl prior art shifter does not have the ability to move directly from neutral to the gate mode. In that prior shifter, the user must move into drive to disengage the ratchet mode, and then can move to gate mode. This is less convenient than the direct access from neutral from either mode as is done in the invention.

FEATURES AND ADVANTAGES OF THE PRESENT INVENTION

Another feature and advantage over the prior art is the provision of electrical switch means incorporated into the assembly of the shifter itself for operating remote readout means, as an option. The switch means can operate an array of lights in a remote readout which can take any suitable configuration and can be mounted at any desired location on the vehicle to indicate the gear position of the shifter. Such remote readouts can be placed on the hood or at other locations easily visible to the driver while racing.

The present invention provides improvements in the area of visual indication of gear position. A linkage carrying a light bulb is provided for direct operation by the main ratchet plate. This linkage includes a drive pin carried on the plate and a slotted member engaged by this pin. This drive arrangement of the pin and the slotted member converts the rotary motion of the ratchet plate into a direct line sliding motion of the light bulb carrying indicator means to permit very simple use of that moving light bulb to light an indicator plate visable to the operator.

The invention provides an apparatus of the character described comprising a three-member linkage having four pivot points. The first pivot point is on the main frame and carries the handle, the ratchet plate, and a radius link extending out to the "floating" pawl. The connection between the radius link and the pawl is the second pivot. The third pivot is between the pawl and a connecting link, the other end of which is pivoted at the fourth point to the handle at a position thereon spaced from the first pivot. This linkage permits the ratchet motion and the gate motion for the two different modes of operation of the invention.

The motion of the lingage is sychronized for proper pawl operation by leaf springs which bear on a pin carried by the radius link.

The invention comprises an improved spring means which biases the handle always to its home position to achieve true ratchet operation, and which aids in biasing the ratchet plate back towards neutral when moving out of park and into reverse position.

The invention also includes improved safety interlock means to assure that the motions of the gear shifter between neutral, reverse and park cannot be done inadvertently, and must be done in accordance with routine safety requirements.

Another improvement of the invention is the provision of a permanent connection, provided by the three-member four pivot linkage described above, of the handle to the gear shifter in a full dual mode shifter, i.e. one which permits operation of the drive gears using either a gate mode or a ratchet mode of operation.

Some prior art shifters require a resetting action at various times in normal use, and in addition permit use of ratchet mode for only one drive gear. The present invention, because of the permanent connection between the parts and the linkage, never requires a resetting action, and in addition permits full ratcheting action between up to three forward drive gears in any combination, that is, from one to two to three or from one to two back to one, etc.

The present invention also provides an apparatus of the character described which is extremely tough and durable to permit long reliable use, which is made of simple stamped parts so that great economies of manufacture are realized, and which is yet highly efficient and practical for its intended use.

BRIEF DESCRIPTION OF THE DRAWINGS

The above and other advantages of the invention will be pointed out or will become evident in the following detailed description and claims, and in the accompanying drawing also forming a part of the disclosure, in which:

DETAILED DESCRIPTION OF THE PREFERRED EMBODIMENT

Figures 1, 2:
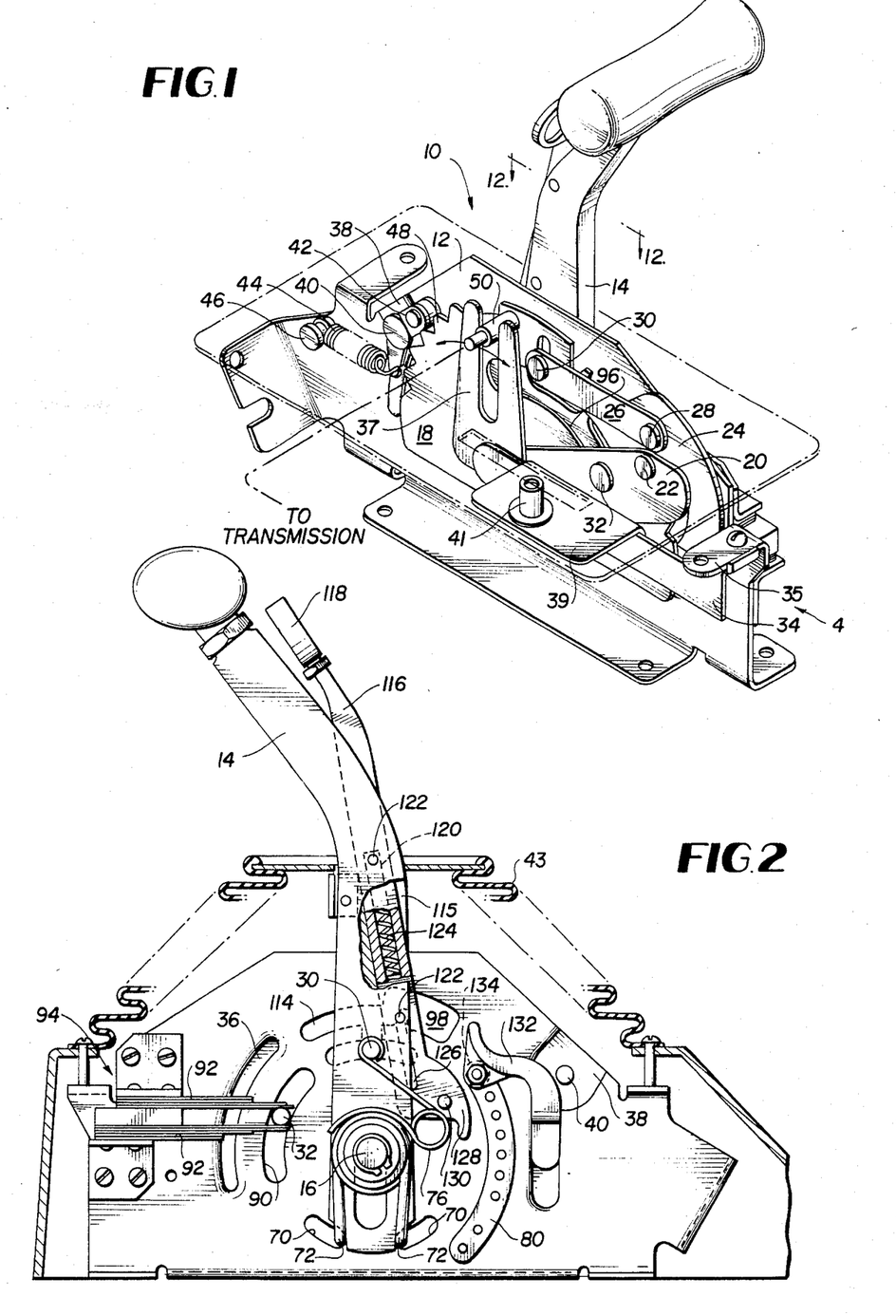
FIG. 1 is a perspective view looking from the linkage side of a shifter embodying the invention.
FIG. 2 is a side elevational view looking from the opposite handle side of the shifter of FIG. 1 showing the protective boot in place and with some parts broken away and in cross-section.

Referring now in detail to the drawings, there is shown a shifter 10 embodying the invention which comprises a main frame member 12 which carries a manually operable handle member 14 pivoted and slidingly mounted on a main frame fixed pivot pin 16, which pin 16 comprises one of the four pivot points of the invention linkage. Pin 16 also carries a ratchet plate 18. One end of a radius link 20 is at pivot 16, and the other end of link 20 is pivotally connected substantially centrally on a pawl member 24 at a pivot point 22. A connecting link 26 has one end pivotally connected as at 28 to the pawl 24, and its other end pivotally connected at 30 to a pin carried on the handle 14 in spaced relation to pin 16. Radius link 20 carries a pin 32 which extends through suitable slots in the main frame and in the ratchet plate 18 over to the handle side (FIG. 2), for purposes explained below.

Main frame 12 carries a left side boss portion 36 and a right side boss portion 38, right and left as viewed in FIG. 2. These are upset portions of the body of the main frame formed while it is being stamped. Another boss portion, not shown, is formed around the hole which receives the main pin 16. These three portions serve as spacing means and support surfaces for the ratchet plate 18 in the assembled shifter. That is, they function as bearing surfaces to position and guide the plate 18 with respect to main frame 12, to thereby simplify the manufacture and assembly of shifters embodying the invention, as well as to reduce the parts required. Heretofore, separate bearing members of one sort or another would be provided for this function.

A pivot 40 on boss portion 38 carries a detent 42 which is loaded by spring 44 also trained about an anchor 46 on the main frame. The detent 42 cooperates with a first set of teeth 48 on the ratchet plate 18 to detent the plate at each of its various selected positions. Ratchet plate 18 also carries a stud or action member 50 by which a cable or link other such means is connected to the transmission, as indicated by the arrows and the dot-dash line in FIG. 1.

Figures 4, 5, 11:
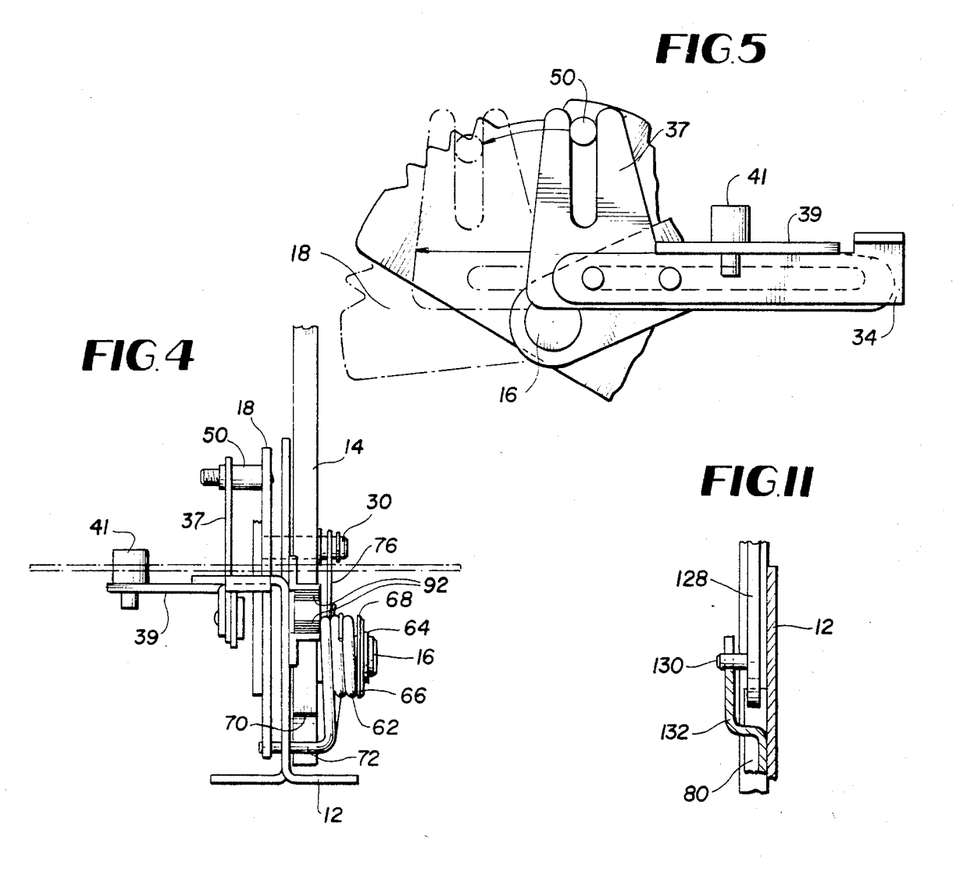
FIG. 4 is an end elevational view looking in the direction of the arrow 4 on FIG. 1.
FIG. 5 is a partial side elevational view of the indicator light driving linkage showing its manner of operation in phantom lines.
FIG. 11 is a partial vertical elevational cross-sectional view taken on line 11—11 of FIG. 10.

The invention provides improved means to indicate to the operator the position at which the invention shifter has placed the transmission in the automobile. To this end, there is provided a fixed bracket 34 fixed at one end to a finger 35 forming part of the main frame 12, and cantilevered to the left, in FIG. 1. At the end of the bracket 34 is a bifurcated finger 37 which receives the stud 50 in its upwardly opening slot. The operation of this part of the invention is illustrated in FIG. 5. The finger 37 is fixed to a slider 39 which includes a flange turned horizontally and outwardly of the support bracket 34. The flange 39 carries the finger 37 as well as an electric light 41.

Thus, referring to FIG. 5, it can be seen that the stud 50 moves in an arc about the main pivot 16, but the bifurcated finger 37 changes this to a rectilinear motion of the bracket 39 on the fixed support bracket 34. The light 41 is used together with the rubber boot housing 43, shown in FIG. 2, to indicate to the driver at the console the gear in which the shifter has at that moment placed the transmission. This is a substantial step forward in shifters, and is an improvement of the present invention with regard to its parent shifter set forth in the patent described above.

The dotted line position in FIG. 5 shows the two extremes of the movable bracket 39 carrying the bifurcated finger 37 with respect to the fixed bracket 34, the corresponding extreme left position of this mechanism as well as the ratchet plate 18 being indicated in dot dash lines.

Plate 18 is formed with upper and lower ratchet teeth 56 and 58 which are separated by a cut-out 60. The cut-out 60 permits the pawl 24 to come to an inactive position when the shifter goes into gate mode, as explained below. While it appears that there are three teeth in set 58 and only two in set 56, this is only an illusion as the end surface 56A acts as a "tooth" in cooperation with the upper end of the pawl 24 when making the first shift upwardly or to the left as viewed in FIG. 14.

Means are provided to normally bias the handle 14 to a generally upright or "home" position as shown in FIGS. 1 and 2. Referring to FIGS. 1, 2, and 4, these means comprise a relatively heavy torsion spring 62 trained about a bushing 64 held on the handle side of the pin 16 by a lock washer 66. Other washers 68, seen best in FIG. 4, are also provided around the pivot pins 16 and 30, and cooperate with the boss portions 36 and 38 to assure proper support and spacing between the main frame 12 and the ratchet plate 18.

Figure 7:
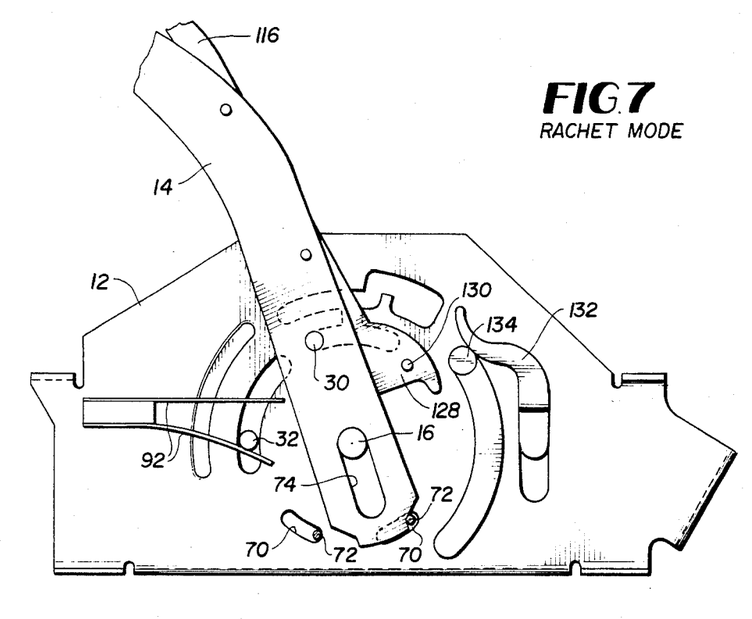
Figure 8:
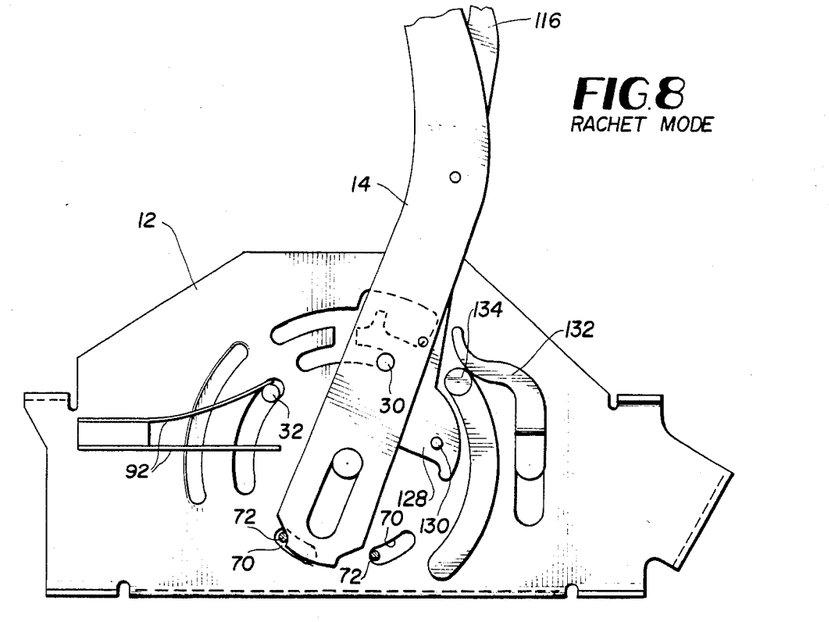

The main frame 12 is formed with a pair of slots 70 which receive the legs 72 of the torsion spring 62. The legs 72 extend generally parallel to the axis of the pivot pin 16. FIGS. 7 and 8 show how the legs 72 of the spring 62 bias the handle to the home position.

Handle 14 is also formed with a slot 74 which receives the pin 16 to allow the handle to move vertically up and down between the gate and ratchet modes, as explained below.

A coil torsion spring 76 has one end looped about and fixed to the pin 30, and its other end formed into an arc resting on the top of the heavier coil torsion spring 62 fitted about the pin 16, as described above. The function of this torsion spring 76 is to normally bias the handle to the up or gate mode position. This force is present at all times, but acts to actually push the handle upwardly when the handle is in the neutral position as described below.

Another advantage resides in the fact that the invention handle has a closed lower end, whereas some prior art shifter handles are open, i.e., they have a cut-out rather than a closed slot. In the event of a harsh handle uplifting action, as can occur during the excitement of a race, a breakage of parts is possible in the prior art, whereas the overload is shared by the two pins 16 and 30 in the invention.

Means are also provided to electrically drive a remote readout of the transmission gear position as controlled by the invention shifter. These means comprise a stationary spring loaded wiper contact block 78 (see FIG. 14) carried by the moving ratchet plate 18, the spring loaded contact member of which cooperates with a fixed contact block 80 carried on the main frame 12, which carries a plurality of electrical contacts, six in the commercial embodiment of the invention, which are one at a time contacted by the moving wiper contact. The electrical signals from these switch means can be used for back-up lights, reverse safety means, as well as for indicating gear position, all as is clear to those skilled in these arts. The blocks could of course be reversed or other equivalent means could be provided, including, preferably, the light 41 and its associated parts shown in FIG. 5.

Figure 14:
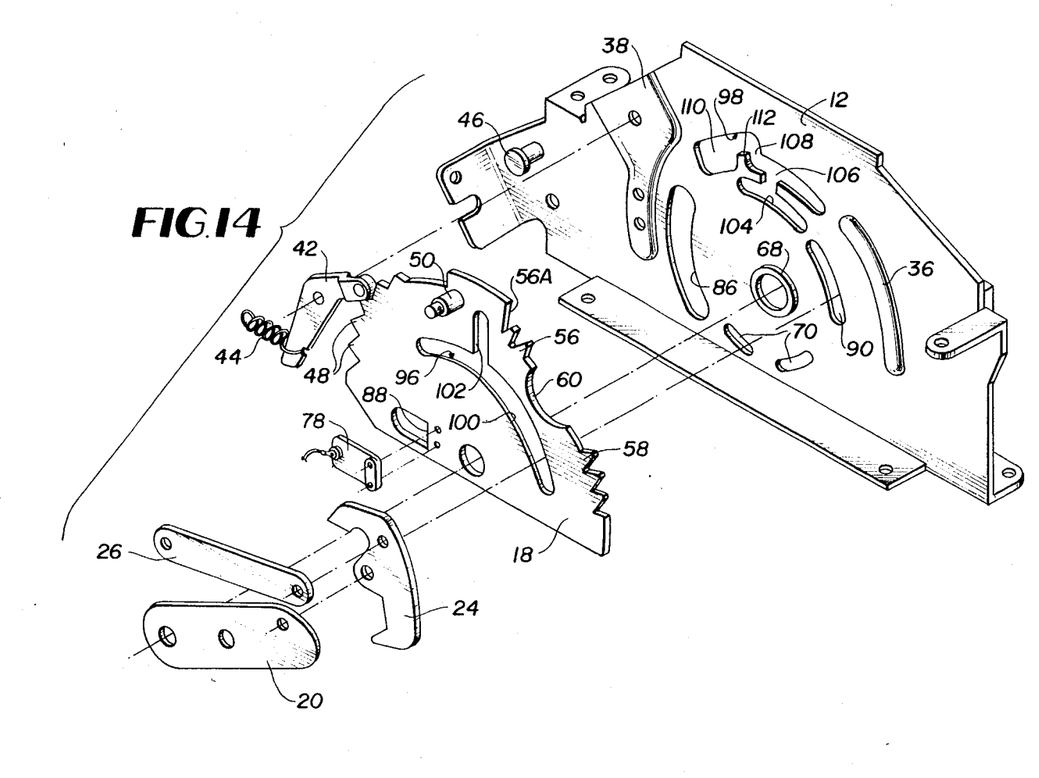
FIG. 14 is a partial exploded perspective view of the shifter embodying the invention.

A wiring harness could be provided to connect the contacts on the blocks 78 and 80 to power, ground, and any suitable remote readout means. Further since the two electrical blocks 78 and 80 are merely bolted in place on their respective two parts of the invention shifter, this entire feature is an easily provided or not provided option. The holes in the plates 12 and 18 are provided in any case, but the manufacturer can opt to include or not include the two electrical parts and wiring as necessary. This gives great versatility to the invention with respect to the prior art. Referring to FIG. 14, the hole 86 for the stationary block 80 and the hole 88 for the wiper block 78 are shown.

Figure 6:
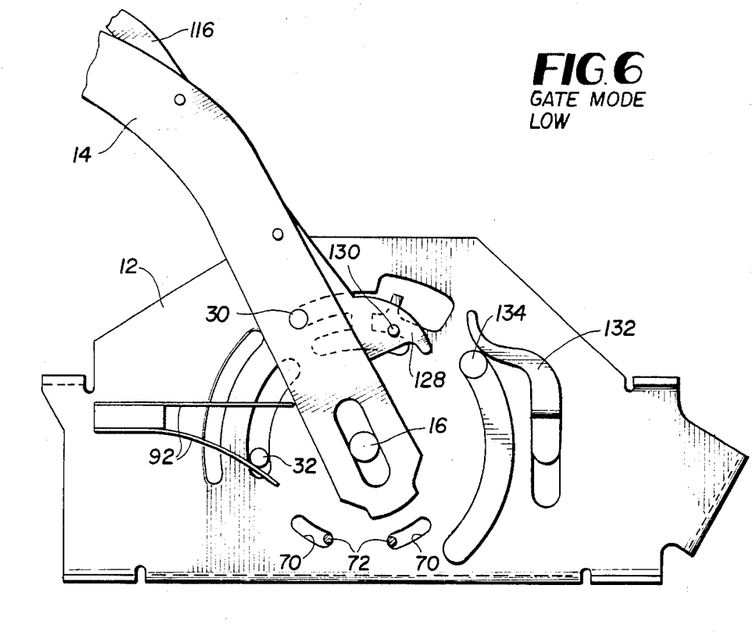
FIGS. 6 through 10 are a series of "action" views looking from the handle's side and showing the position of the shifter when used to select the various gear positions.

Means are provided to load the linkage of the parts 24, 26 and 20 with respect to the teeth 56 and 58 on the ratchet plate so that the mechanism will work in proper synchronization and the pawl 24 will engage the ratchet plate teeth in the proper sequence and at the proper time during operation of the invention in its various modes, as explained in the Operation section below. To this end, the pin 32 on the radius link 20 extends through a clearance opening 90 in the main frame, and is held snugly between a pair of leaf springs 92 which are adjustably mounted on main frame 12 by means of mounting assembly 94. Assembly 94 provides an ajustment so that the pressure and location of the spring force on the pin 32 can be controlled. As indicated by the dotted line showing in FIGS. 6 and 7, the spring 92 normally biases the handle to its home position. However, that is incidental to the synchronization function of the leaf springs 92. The main centering function is done by the torsion spring 62. Further, the centering done by the leaf springs 92 is indirect, i.e., it must act via the pin 32 which is on the radius link 20, which in turn acts through the pawl 24 and then through the connecting link 26, to only then aid in the centering function via the pin 30 on the handle 14. Thus, this is a positive safety back-up feature.

As shown in the preferred embodiment of FIG. 2, the leaf springs 92 are built up in layers to provide a variable spring force. This gradation or increasing return force with increasing distance away from the home solid-line position of the pin 32 is required because it decreases the time for response (more force, faster action and faster shifting-time) which in practice has been demonstrated as desirable during racing. Also, the springs are used as cantilevers because this is good design practice, and it is stronger.

An alternate form 92A of such a variable response spring is shown in FIG. 10 of the above identified parent patent. The increase in spring force is provided by the taper in the sides of a single thickness of spring metal rather than in built up layers of spring metal of the same general configuration. Still another from 92B of spring to accomplish this function is shown in FIG. 8 of said patent where the spring metal is tapered in the thickness rather than in the width. These forms are also usable in the present invention.

The dual mode operation of the invention shifter is controlled by the pin 30 which drives the ratchet plate 18 and these two in turn control the transmission via the anchor 50. Anchor 50 can be located as necessary virtually anywhere on plate 18, as is clear to those skilled in these arts. In such case, a separate pin, stud or anchor could be provided to drive light 41 and its associated parts. The motion of the pin 30 is controlled by a pair of composite openings; opening 96 in the ratchet plate 18 and opening 98 in the main frame 12. Opening 96 comprises an elongated arcuate portion 100 formed about radii from the axis of the pivot pin 16 and by a vertical or radial portion 102 extending upwardly from a predetermined location in the arcuate section 100. Composite opening 98 in the main frame 12 comprises a relatively small extent arcuate portion 104 which overlies and is in registry with the arcuate portion 100 of opening 96. Opening 98 further comprises a short vertical or radial section 106 and thereafter is made up of a pair of topmost sections, 108 for reverse and 110 for park. An upstanding stop 112 separates the two sections 108 and 110. These sections 108 and 110 overlie and are sometimes in registry with the vertical section 102 of composite opening 96. Composite opening 98 further comprises an arcuate section 114 at the radial level of reverse section 108 and extending to the opposite side of the neutral position.

In contrast to the shifter of the parent patent identified above, the present invention includes a manually operable reverse lock-out lever, which, together with certain cooperating parts, permits the advantageous modus operandi of the present invention. That is, the reverse lock-out lever has a substantial role in the invention's manner of operation of permitting a full ratchet mode of operation between the drive gears, as well as a full gate mode of operation between all of the gears, and permitting the operator to select which mode he wishes to use, with assurance that no inadvertent operations will occur.

Figure 12:
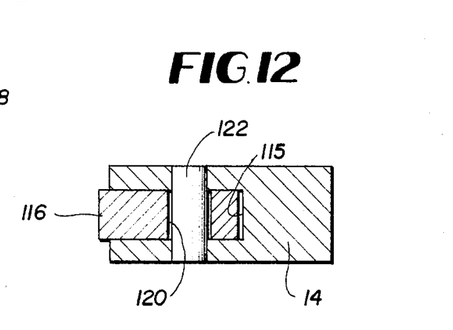
FIG. 12 is a partial cross-sectional view through the handle taken on line 12—12 on FIG. 1.

To this end, referring to FIGS. 1, 2, and 12, the main operating handle 14 is slotted on one side, as at 115 (FIGS. 1 and 12) and has an operating handle member 116 slidably mounted therein. The reverse lock-out lever 116 carries a finger grip member 118 at its upper end, see also FIG. 3. The reverse lock-out lever is formed with a slot 120 which receives upper and lower pins, set screws, rivets or the like, which bridge the slot in the main lever 14 and which are positioned inside of the reverse lock-out lever slot 120, see FIG. 12. A spring 124 is held trapped in the reverse lock-out lever slot 122 and is constrained by the upper slide pin 122, and a seat for the compression spring 124 formed in the reverse lock-out lever 116. Thus, the compression spring 124 normally urges the reverse lock-out lever 116 to the downward position shown in FIG. 2. A much smaller slot 126 is formed at the lower end at the reverse lock-out lever for cooperation with the lower lever mounting pin or the like 122.

At its lower end, the reverse lock-out lever 116 is formed with an extending foot portion 128 which carries an extending pin 130.

As will be set forth in more detail in the operation section below, the foot portion 128 on the reverse lock-out lever cooperates with a catch member 132 secured by welding or the like to the main frame 12, and also cooperates with a bushing 134 formed of steel or the like strong material and which is part of the bolt and nut assembly holding the electrical block 80 in place on the main frame. These parts 132 and 134 cooperating with the foot portion 128 and its pin 130 play an important role in the invention's manner of operation, as set forth in the operation section below.

OPERATION

As can be best appreciated from a simultaneous reading of the following description together with viewing of FIGS. 2, 5, 6, 10, and 13, when in ratchet mode through the drive gears and neutral, pin 30 reciprocates back and forth in the opening 100 which is then lined up with the section 104 of the main frame composite opening 98. As the gears are advanced, the elongated arcuate section 100 of composite opening 96 advances around from position to position as the pin moves only slightly to and fro from its home position as defined by opening section 104. As in FIGS. 1 and 14, the pawl and ratchet teeth operate just as a conventional ratchet drive to move the transmission among neutral and the forward gears.

The radial section 102 of composite opening 96 corresponds to neutral. When in neutral, pin 30 may be raised through the aligned sections 102 and 106 and then moved left and right, see FIGS. 6, 9, and 13, to the reverse position defined by the opening portion 108. This raising motion changes operation over to gate mode. In order to move from reverse to park, it is necessary to lift the handle 14 to the uppermost position wherein the pin 16 will be at the bottom of the handle slot 74 to lift the pin 30 over the stop 112. Since the section 102 has no arcuate extent greater than the diameter of the pin 30, all of this motion forces the ratchet plate 18 carrying anchor 50 and thus the transmission through the three positions of neutral, reverse, and park. While this is occurring, the operating end of the pawl 24 is located in the cut-out 60 of the ratchet plate so that the ratchet action is effectively disengaged or disabled while the transmission is moved among reverse, park and neutral.

This motion of the top end of the pawl 24 into the cut-out 62 will occur because as the handle is lifted and then swung to the left, the radius link will no longer move, and thus the connecting link will pull the pawl around the pivot 22 between the radius link and the pawl urging one end of the pawl into the cut-out and the other end well away from the lower ratchet teeth 58. This condition will continue to obtain with further lifting and moving of the shifter parts between reverse and park. In effect, the ratchet linkage drops out once the handle is lifted to move the pin 30 through the gears in gate mode. At the same time the ratchet stays firmly physically connected and ready to operate as soon as the handle is lowered. This is an improvement over prior art devices where the ratchet mechanism undergoes a physical disconnection of parts when moving out of ratchet mode.

When in neutral, pawl 24 can enter cut-out 60, and at this time either gate mode or ratchet mode can be selected. This is the added versatility feature discussed above.

The detent 42 under urging of the spring 44 will solidly locate the ratchet plate 18 in each of the positions, park, reverse, neutral, drive and one or two lower forward gears ratios as may be available, in that sufficient teeth 48 are provided for all of these gear positions. The invention can be easily modified for transmissions having only two forward gear ranges (drive and low), as is clear to those skilled in these arts.

Figure 13:
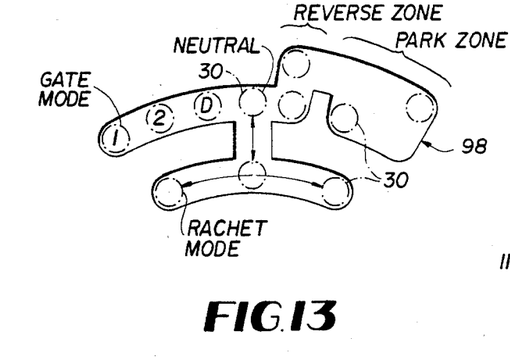
FIG. 13 is a schematic diagram showing the shift pattern of the shifter in accordance with the invention.

The present invention has numerous advantages over the prior art including the shifter of the parent application identified above. These advantages and improved methods of operation include the provision of the two tracks, one for gate mode and the other for ratchet mode, the two tracks being best illustrated in FIG. 13 and interconnected by the radial vertical section which corresponds to neutral. The pin 30 interacting on the sides of the slots's segments of the showing of FIG. 13 controls the motion of the pin and hence the motion of the transmission being controlled. The links and pawl used for the ratchet mode are caused to simply go into an idle position and to sort of "drag along" when the shifter is being operated in gate mode, as described above. In order to change modes from gate to ratchet, one pushes down on the main handle 14 when in neutral, this engages the ratchet teeth, and the transmission can be operated in ratchet mode as indicated in FIGS. 13, and 7 and 8.

Another improvement of the invention pertains to reverse gear and safety aspects of its use. Reverse gear, as described above, can be accessed only from gate mode, and not in ratchet mode. That in and of itself is a safety feature, that is, the user is not likely to put the transmission in reverse during the excitement of a race while he is changing gears using the ratchet mode.

Figure 9:
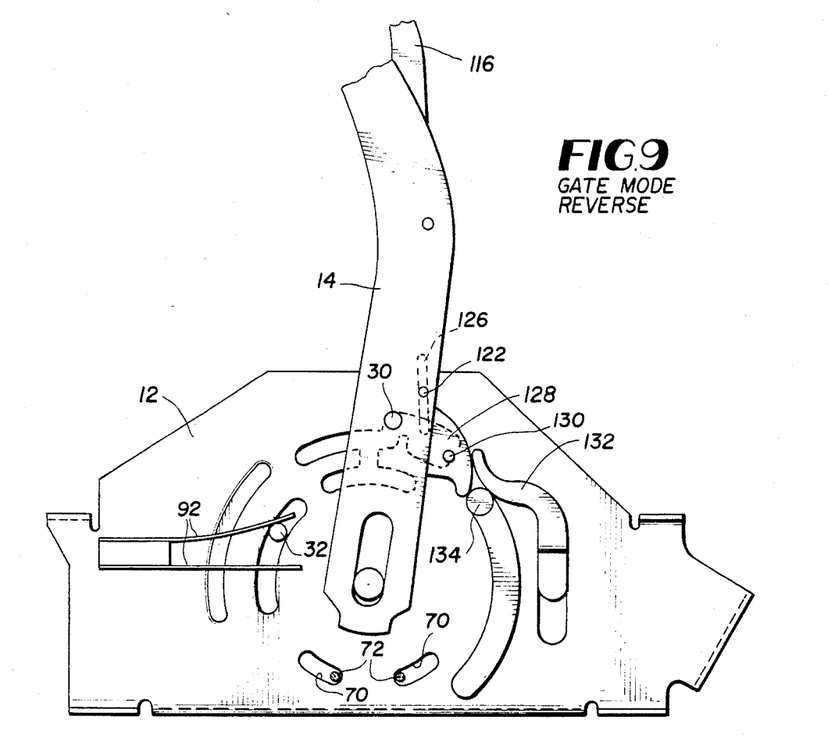
Figure 10:
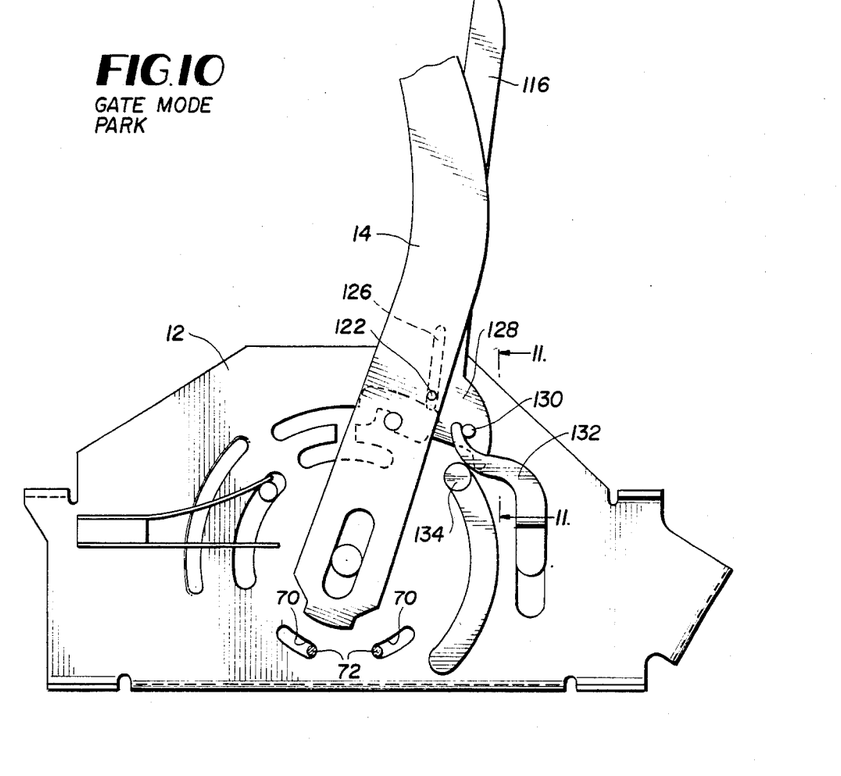

To get into reverse gear, the operator must lift the reverse lever 116 to come to the position of FIG. 9 showing reverse. This position is defined by engagement of the reverse lever foot 128 with the catch member 132 and/or the bushing 134.

It should be noted that the reverse handle 116 must be lifted in order to engage reverse in order to get by the bushing 134. That is another unique feature of the invention, i.e., an added safety to prevent inadvertent access to reverse gear.

To move from reverse to park, the operator must again lift the reverse lever 116 in order to get over the catch member 132. This is the FIG. 10 park position, the pin 130 on the foot 128 engaging on the inside of the hook portion at the end of the catch member 132.

To move now from reverse back to park, the invention provides yet another safety feature, namely a requirement to lift the reverse lever 116 in order to carry the pin 130 up over the hook end of the catch member 132. This hook portion is an obstruction which does not permit an accidental movement out of park back into reverse without the affirmative action of the lifting of the lever 116.

Finally, as still another safety feature from reverse back to neutral, the operator must now push down on the main handle 14 in order to cause the pin 30 to move through the track to the neutral position and clear the various corners shown in FIG. 13 provided in this track between reverse and neutral.

This is a unique added safety feature of the invention, that is the requirement to push the main handle down in order to get out of reverse into neutral.

Numerous prior art shifters require resetting and multiple operations at various stages in their operation. All of these resettings and multiple steps to access gears is eliminated in the present invention. The operator can move between gate mode and ratchet mode by simply moving the handle up or down at the neutral position between the tracks. This one motion achieves either ratchet mode or gate mode, and the operator can proceed to move through the gears as necessary, the only additions being the various blocking actions which occur automatically as safety devices concerning reverse and park as described above. Further, in the drive gears, the invention shifter will permit ratchet shifting up and down among the multiple drive gears as many times as is necessary. Certain prior shifters can only accomplish a single shift and then must be reset, this is an extreme disadvantage in racing.

More specifically, most of these advantages have to do with the cooperation between the invention shifter and the valve bodies in the transmissions being controlled. There are two general types of these valve bodies, and the invention shifter can work with both of them, whereas some prior art shifters can only work with one type or the other. The invention has full versatility and compatibility in this respect, because of its true ratchet action permitting true ratchet motion and control of the transmission in both directions, that is up and down among the gears. The valve body is the critical part of the transmission such controls the selection of gears within the transmission, and the present invention shifter operates directly on that, and thus with all of the popular types of valve bodies as contrasted to the prior art which cannot do so.

Figure 3:
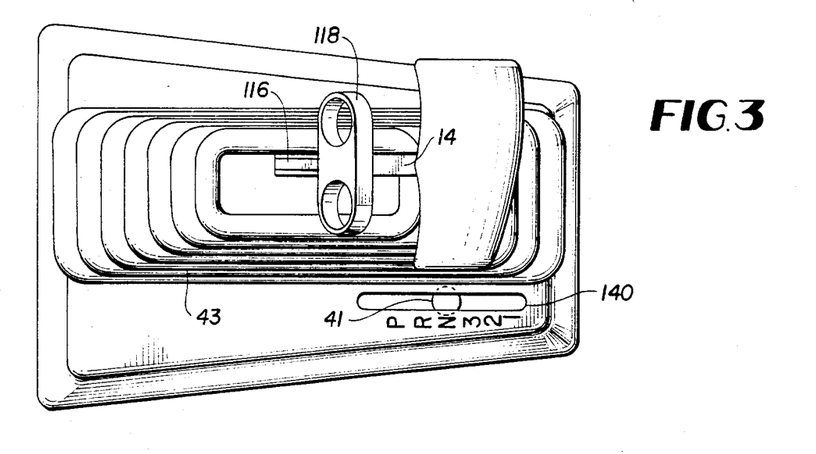
FIG. 3 is a top plan view of the shifter as it would look to the driver when installed in an automobile.

Yet another advantage resides in the improved readout means, the light 41 and associated parts shown in FIG. 5 which converts the angular motion of the ratchet plate 18 into a true linear translation, to thus permit the operator to see the light 41 through the indicator track 140 right at his console in the car, see FIG. 3.

While the invention has been described in detail above, it is to be understood that this detailed description is by way of example only, and the protection granted is to be limited only within the spirit of the invention and the scope of the following claims.

I claim:

1. A shifter for an automatic transmission comprising ratchet means operable to control said transmission through some of its gears in a ratchet mode of operation and gate means operable to control said transmission through all of its gears in a gate mode of operation, said shifter further comprising a main frame and a handle, means to mount said handle on said main frame to permit said handle to control said ratchet means and said gate means and to move between controlling said ratchet means and said gate means, said ratchet means comprising ratchet teeth and a ratchet pawl, said ratchet pawl being mounted in link means, said link means being controlled by said handle means so that said pawl cooperates with said ratchet teeth when said shifter is operated in said ratchet mode, and said link means being operative to keep said pawl out of operative engagement with said ratchet teeth when said shifter is operated in said gate mode.

2. The combination of claim 1, said means to disable the cooperation between said ratchet pawl and said ratchet teeth comprising a clearance cut-out between said ratchet teeth, and said link means being so arranged that said pawl is moved by said link means when said shifter is in gate mode in such a way that one end of said pawl is in said cut-out while the other end of said pawl is moved away from its cooperating ratchet teeth.

3. The combination of claim 1, said shifter comprising a ratchet plate formed with said ratchet teeth, and means interconnecting said ratchet plate and said transmission, whereby the position of said ratchet plate controls the gear selection in said transmission.

4. The combination of claim 1, said handle mounting means comprising a pivot pin mounted on said main frame and a slot formed in said handle to slidingly receive said pin, and said handle mounting means further comprising means to permit pivotal motion of said handle about said pin in all positions of said handle with respect to said pin.

5. The combination on claim 4, said shifter comprising a ratchet plate formed with said ratchet teeth, means interconnecting said ratchet plate and said transmission, whereby the position of said ratchet plate controls the gear selection in said transmission, and means to mount said ratchet plate on said pivot pin on said main frame.

6. The combination on claim 1, wherein the transmission gears controlled in said gate mode include reverse and park, and spring means biasing said handle normally towards said gate mode of operation.

7. The combination of claim 1, said shifter comprising electrical switch means, said switch means comprising a single wiper electrical contact member on one of said main frame and a moving member in said shifter, said switch means further comprising a multi-electrical contact block on the other of said main frame and said moving member, and said wiper contact and said contact block being operatively cooperable to provide an electrical signal indicative of the gear position of the transmission being controlled by said shifter, whereby said switch means comprise a built-in electrical drive for a remote readout or the like.

8. The combination of claim 1, said handle mounting means comprising a pivot pin mounted in said main frame, said handle being mounted on said pivot pin for at least pivotal motion thereon, said link means comprising a radius link extending from said pivot pin to a first location on said pawl and being pivotally connected to said pawl thereat, a connecting link pivotally connected at one end to said handle at a position thereon in spaced predetermined relation to said handle pivot pin and the other end of said connecting link being pivotally connected to said pawl at a position thereon in predetermined spaced relation to said pivotal connection between said pawl and said radius link, whereby said pawl "floats" on said connecting link and said radius link while said handle is always connected to said pawl via said handle pivot pin and said pivot to said connecting link.

9. The combination of claim 8, and variable response spring means for biasing said linkage to keep said ratchet teeth and said pawl synchronized in said ratchet mode of operation, a pin on said radius link, said pin extending through a guide opening in said main frame for cooperation with said variable response spring means, and said variable response spring means comprising a pair of leaf springs adjustably positioned on said main frame one on either side of said radius link pin.

10. The combination of claim 3, and spacing and bearing means between said main plate and said ratchet plate, said bearing and spacing means comprising boss portions formed in said main plate and extending out from the plane thereof to the plane of said ratchet plate.

11. The combination of claim 1, and spring means for normally biasing said handle to a home position when said handle is operated in its ratchet mode, said handle mounting means comprising a pivot pin mounted in said main frame, said handle being mounted on said pivot pin for at least pivotal motion thereon, said link means and said spring means comprising a torsion spring coiled about said pivot pin, said torsion spring comprising a pair of end legs extending through guide openings in said main frame and cooperating with an outer end portion of said handle, whereby one or the other of the legs of said torsion spring is contacted by said handle when said handle is rocked to or fro away from said home position.

12. The combination of claim 11, and means to permit said handle is disengage said torsion spring when said handle is moved away from said ratchet mode of operation into said gate mode of operation.

13. The combination of claim 12, said means to permit comprising a slot formed in said handle to slidingly receive said pin and to permit pivotal motion of said handle about said pin in all positions of said handle with respect to said pin.

14. The combination of claim 1, and variable response spring means for biasing said link means to keep said ratchet means synchronized in said ratchet mode of operation.

15. The combination of claim 14, said spring means comprising a layered leaf spring.

16. The combination of claim 14, said spring means comprising a leaf spring member tapered in its thickness.

17. The combination of claim 14, said spring means comprising a leaf spring member tapered in its width.

18. The combination of claim 1, said ratchet means comprising a ratchet plate formed with said ratchet teeth, said link means comprising a pin provided between said handle and one of the links in said link means in spaced relation on said handle to said means mounting said handle on said main frame, said ratchet plate and said main frame each being formed with a composite slot, said composite slots overlying each other and receiving said pin between said handle and said one of said links, and the relative positions of said two slots and said pin all to each other defining said ratchet and said gate modes of operation and the particular gear position in which said shifter will place said transmission.

19. The combination of claim 18, said handle mounting means comprising a pivot pin mounted on said main frame and a slot formed in said handle to slidingly receive said pin and to permit pivotal motion of said handle about said pin in all positions of said handle with respect to said pin.

20. The combination of claim 19, said two slots comprising overlying vertical slot portions which cooperate with said pin and with each other to control said gate mode of operation and comprising overlying arcuate slot portions which cooperate with each other and with said pin to control said ratchet mode of operation, and the aligned position of said vertical slot portions corresponding to the neutral position of said shifter and of said transmission to permit radial motion of said pin therethrough to accomplish changes of mode of operation.

21. The combination of claim 19, each of said slots comprising a generally radially disposed slot portion, the aligned position of said radial slot portions corresponding to the neutral gear position of said transmission, said main frame comprising reverse and park slot portions extending from the radial outermost portion of said vertical slot portion in said main frame, the vertical slot portion in said ratchet plate extending radially outwardly sufficiently to overlie said reverse and park slot portions, the arcuate width of both of said vertical slot portions being substantially equal to the diameter of said pin, whereby motion of said pin in said reverse and park slot portions will move said ratchet plate via said ratchet plate vertical slot portion while said pawl is disabled while said shifter is thereby moved to its gate mode of operation.

22. The combination of claim 19, each of said ratchet plate slots comprising an arcuate portion which at least partially overlies each other in all gear positions in the ratchet mode of operation of said shifter, said arcuate slot portion in said main frame having an arcuate length corresponding to the total distance of the to and fro rocking motion of said handle so that said main frame arcuate slot portion defines the limits of said handle rocking motion, and said ratchet plate arcuate slot portion having a relatively longer arcuate length sufficient to permit said ratchet teeth and pawl to control the motion of said ratchet plate in said ratchet mode of operation.

23. The combination of claim 19, said main frame composite slot comprising an arcuately disposed ratchet track and an arcuately disposed gate track and a radially disposed portion interconnecting said tracks and corresponding to the neutral position of said shifter, means to permit said handle to control the motion of said transmission in neutral and the forward drive gears only in said ratchet mode of operation, and said gate mode track having portions corresponding to all of the gears and neutral of said transmission.

24. The combination of claim 23, and means for controlling the motion of said pin in said gate mode track among neutral, reverse, and park gears of said transmission to prevent inadvertent motion into any one of said gears of neutral, reverse, and park, said last mentioned means comprising a reverse lock-out lever slidably mounted on said handle, spring means normally biasing said reverse lock-out lever to the down position of said lever on said handle, stop means provided between said reverse lock-out lever and said main frame, and said stop means requiring the operator to raise said reverse lock-out lever with respect to said handle to permit said reverse lock-out lever together with said handle to move from neutral to reverse and from reverse to park and from park to reverse.

25. The combination of claim 24, said stop means comprising a catch member mounted on said main frame and a foot portion carrying pin means at the lower end of said reverse lock-out lever, said pin means being cooperable with said catch member to control the motion of said reverse lock-out lever together with said handle between said gear positions of neutral, park and reverse.

26. The combination of claim 1, and spring means for normally biasing said handle to a home position when said handle is operating in its ratchet mode, said spring means comprising a torsion spring coiled about a pivot pin in said mounting means between said handle and said main frame, said torsion spring comprising legs cooperating with a portion of said handle so that one or the other of said legs of said torsion spring is contacted by said handle when said handle is rocked to or fro away from said home position.

27. The combination of claim 26, said torsion spring being located on the side of said main frame opposite said handle, and said main frame being formed with arcuate guide openings receiving said legs of said torsion spring.

28. The combination of claim 26, and means to permit said handle to disengage said torsion spring when said handle is moved from said ratchet mode of operation into said gate mode of operation.

29. The combination of claim 28, said means to permit said handle to disengage said torsion spring comprising a slot formed in said handle to slidingly receive said pin and to permit pivotal motion of said handle about said pin in all positions of said handle with respect to said pin.

30. In a shifter for an automatic transmission of the type comprising means which moves with arcuate motion about a pivot and the position of which corresponds to the gear selected in said transmission, the improvement comprising motion translating means for converting the arcuate motion of said arcuate motion means into a linear translational motion, said last mentioned means comprising bifurcated finger means defining a slot cooperable with a stud means on said arcuate motion means, the length of said slot corresponding to the total extent of motion of said stud in said slot corresponding to the full extent of the arcuate motion of said arcuate moving means, said bifurcated finger means cooperating with a linear slider means, indicator means on said linear slider means, said indicator means thus corresponding to and giving an indication of the position of said arcuate motion means corresponding to a selected gear position of said transmission, said indicator means comprising an electrical light, a console for said shifter, and means to permit the operator to view the position of said electrical light in said console.

31. A shifter for an automatic transmission having a ratchet mode and a gate mode of operation, the combination comprising a main frame, a handle, means to mount said handle on said main frame for motion with respect thereto, linkage means interconnecting said handle, said main frame and the ratchet pawl used in said ratchet mode of operation, said linkage means including a pin, said pin being part of transmission position controlling means, a composite slot formed in said main frame, said pin being positioned in said slot and said slot controlling the motion of said pin, said composite slot comprising a portion permitting said ratchet mode of operation to control the motion of said transmission through neutral and the forward drive gears only, and said composite further comprising a portion to control the motion of said pin and said transmission through all of the gears and the neutral position of said transmission, means to prevent inadvertent motion of said pin and of said transmission into or out of various ones of the neutral, reverse, and park positions of said transmission, said preventing means comprising a reverse lock-out lever, means to slidingly mount said reverse lock-out lever on said handle, spring means normally urging said reverse lock-out lever in one direction with respect to said handle, second spring means normally urging said handle in the opposite direction with respect to said main frame as compared to the direction of urging of said first spring means of said lock-out lever with respect to said handle, said preventing means further comprising stop means provided on said main frame and cooperable with portions of said reverse lock-out lever to cause the operator to move said handle with respect to said frame and said lock-out lever with respect to said handle independently to thereby prevent inadvertent motion of said handle and of said transmission from neutral to reverse, from reverse to park, from park to reverse, and from reverse to neutral.

32. The combination of claim 31, said handle being formed with a slot to slidingly receive said reverse lock-out lever, said reverse lock-out lever being formed with a slot to receive said spring means urging said motion of said lever with respect to said handle, whereby said reverse lock lever is effectively part of said handle and moves together with said handle with respect to said main frame.

33. The combination of claim 31, said preventing means comprising a catch member fixed to said main frame, a stop bushing fixed to said frame, a foot portion of said reverse lock out lever at the end thereof in juxtaposition with respect to said catch member and said bushing, and pin means on said reverse lock-out lever foot portion cooperable with said catch member and said bushing.

34. The combination of claim 31, said linkage means comprising a ratchet plate having ratchet teeth for cooperation with said ratchet pawl, said linkage comprising a radius link extending from the mounting means between said handle and said main frame to a first location on said pawl and being pivotally connected to said pawl thereat, a connecting link pivotally connected at one end to said pawl at a position thereon in a predetermined spaced relation to said pivotal connection between said pawl and said radius link, and means to disable the cooperation between said ratchet pawl and said ratchet teeth when said handle is moved from said ratchet mode of operation to said gate mode of operation, whereby said pawl floats on said connecting link and said radius link while said handle is always connected to said linkage via said pivot to said connecting link.

35. The combination of claim 34, said means to disable the cooperation between said ratchet pawl and said ratchet teeth comprising a cut-out between the ratchet teeth on said ratchet plate, and said linkage means being so arranged that said pawl is moved by said linkage means when said shifter is in gate mode in such a way that one end of said pawl is in said cut-out while the other end of said pawl is moved away from its cooperating ratchet teeth on said ratchet plate.

36. The combination of claim 34, and said linkage means comprising a pin between said handle and the other end of said connecting link in spaced relation on said handle to said means mounting said handle on said main frame, said ratchet plate and said main frame each being formed with a composite slot, said composite slots overlying each other and receiving said pin between said handle and said connecting link, and the relative positions of said two slots and said pin all to each other defining said ratchet and said gate modes of operation and the particular gear position in which said shifter will place said transmission.

37. The combination of claim 36, said handle mounting means comprising a pivot pin mounted on said main frame and a slot formed in said handle to slidably receive said pin and to permit pivotal motion of said handle about said pin in all positions of said handle with respect to said pin.

38. The combination of claim 37, said two slots comprising overlying vertical slot portions which cooperate with said pin and with each other to control said gate mode of operation and comprising overlying arcuate slot portions which cooperate with each other and with said pin to control said ratchet mode of operation, and the aligned position of said vertical slot portions corresponding to the neutral position of said shifter and of said transmission to permit radial motion of said pin therethrough to accomplish changes of mode of operation.

39. The combination of claim 37, each of said ratchet plate slots comprising an arcuate portion which at least partially overlie each other in all gear positions in the ratchet mode of operation of said shifter, said arcuate slot portion in said main frame having an arcuate length corresponding to the total distance of the to and fro rocking motion of said handle so that said main frame arcuate slot portion defines the limits of said handle rocking motion, and said ratchet plate arcuate slot portion having a relatively longer arcuate length sufficient to permit said ratchet teeth and pawl to control the motion of said ratchet plate in said ratchet mode of operation.

40. The combination of claim 37, each of said slots comprising a generally radially disposed slot portion, the aligned positions of said radial slot portions corresponding to the neutral gear position of said transmission, said main frame comprising reverse and park slot portions extending from the radial outermost portion of said vertical slot portion in said main frame, the vertical slot portion in said ratchet plate extending radially outwardly sufficient to overlie said reverse and park slot portions, the arcuate width of both of said vertical slot portions being substantially equal to the diameter of said pin, whereby motion of said pin in said reverse and park slot portions will move said ratchet plate via said ratchet plate vertical slot portion while said pawl is disabled while said shifter is thereby moved to its gate mode of operation.

41. The combination of claim 34, and variable response spring means for biasing said linkage means to keep said ratchet plate and said pawl synchronized in said ratchet mode of operation.

42. The combination of claim 41, a pin on said radius link, said pin extending through a guide opening in said main frame for cooperation with said variable response spring means, and said variable response spring means comprising a pair of leaf springs adjustably positioned on said main frame one on either side of said radius link pin.

43. The combination of claim 41, said spring means comprising a leaf spring member tapered in its width.

44. The combination of claim 41, said spring means comprising a leaf spring member tapered in its thickness.

45. The combination of claim 41, said spring means comprising a layered leaf spring.

* * * * *